US012350702B2

(12) United States Patent
Freidberg et al.

(10) Patent No.: US 12,350,702 B2
(45) Date of Patent: Jul. 8, 2025

(54) LIQUID SEALANT DISPENSER TIP

(71) Applicant: LOUISIANA-PACIFIC CORPORATION, Nashville, TN (US)

(72) Inventors: Neil Freidberg, Lebanon, TN (US); Craig Miles, Nashville, TN (US); Rylie Barling, Nashville, TN (US)

(73) Assignee: LOUISIANA-PACIFIC CORP., Nashville, TN (US)

( * ) Notice: Subject to any disclaimer, the term of this patent is extended or adjusted under 35 U.S.C. 154(b) by 0 days.

(21) Appl. No.: 18/401,590

(22) Filed: Dec. 31, 2023

(65) Prior Publication Data

US 2024/0408640 A1 Dec. 12, 2024

Related U.S. Application Data

(60) Provisional application No. 63/471,293, filed on Jun. 6, 2023.

(51) Int. Cl.
*B05C 17/005* (2006.01)

(52) U.S. Cl.
CPC .. *B05C 17/00516* (2013.01); *B05C 17/00513* (2013.01)

(58) Field of Classification Search
CPC ......... B05C 17/00503; B05C 17/00516; E04F 21/02
See application file for complete search history.

(56) References Cited

U.S. PATENT DOCUMENTS

| | | | | |
|---|---|---|---|---|
| 2,636,214 | A * | 4/1953 | Slusher | B05C 17/00516 401/139 |
| 4,872,778 | A * | 10/1989 | Longo | B05C 17/00516 401/48 |
| 6,311,871 | B1 | 11/2001 | Binder | |
| 9,993,837 | B2 | 6/2018 | Ullett | |
| 2004/0211794 | A1* | 10/2004 | O'Jack | B05C 17/00516 222/568 |
| 2007/0235471 | A1 | 10/2007 | Radermacher | |
| 2010/0219204 | A1 | 9/2010 | Dean et al. | |

(Continued)

FOREIGN PATENT DOCUMENTS

| | | | |
|---|---|---|---|
| CN | 116078627 | A * | 5/2023 |
| DE | 19322832 | A1 | 12/2004 |

OTHER PUBLICATIONS

Machine translation of Hua, CN 116078627 A (Year: 2023).*

(Continued)

*Primary Examiner* — David P Angwin
*Assistant Examiner* — Bradley S Oliver
(74) *Attorney, Agent, or Firm* — Wayne Edward Ramage; Baker Donelson

(57) ABSTRACT

A dispensing tip or tool for use in dispensing a caulking or liquid sealant in conjunction with caulking guns or similar tools. The tip flattens in cross-section towards the dispensing end, with a rectilinear opening causing the liquid sealant to emerge at a specific thickness and width. A pair of guide tabs cause the sealant to emerge and be placed over a gap, seam or joint to be sealed. A fin extending from the bottom fits within the seam, gap or joint to help guide the tool during use. A notch in the bottom side of the opening allows for more sealant flow into the seam, gap or joint itself.

18 Claims, 8 Drawing Sheets

(56) References Cited

U.S. PATENT DOCUMENTS

| | | | |
|---|---|---|---|
| 2016/0114350 A1 | 4/2016 | Brodbeck et al. | |
| 2022/0219193 A1* | 7/2022 | Lewis | B05C 17/002 |

OTHER PUBLICATIONS

International Search Report and Written Opinion, PCT/US23/86587, Lousiana-Pacific Corp. (international filing date Dec. 31, 2023).

International Search Report and Written Opinion, PCT/US24/40454, Lousiana-Pacific Corp. (international filing date Jul. 31, 2024).

* cited by examiner

LIQUID SEALANT DISPENSER TIP

This application claims benefit of and priority to U.S. Prov. App. No. 63/471,293, filed Jun. 6, 2023, which is incorporated herein in its entirety by specific reference for all purposes.

FIELD OF INVENTION

This invention relates to a tip for use with an apparatus for dispensing a caulking or liquid sealant.

BACKGROUND OF INVENTION

Sealing seams for an exterior bonded or integrated weather resistant barrier (WRB) sheathing panel is typically done with a sealing tape or a liquid sealant. At present, liquid sealant is applied using a two-handed caulking gun and squeegee/spreader. The user uses the caulking gun to apply the liquid sealant to the gap between the panels and the outer surface of the panels immediately adjacent or proximate to the gap. The user then must set down the caulking gun, and pick up and use the squeegee to spread the liquid sealant on the outer surface of the panels to the recommended thickness.

Frequently the user is applying the liquid sealant to a wall or roof structure above the ground, and often when standing on a ladder. The prior art application process requires the user to use both hands, and they thereby lose the three points of contact required for safe use of a ladder. The prior art application process also requires the user to frequently switch items while on the ladder, and spend frequent time descending and ascending the ladder to switch tips or equipment, resulting in significant time and labor costs as well as possible negative effects on safe use of the ladder.

SUMMARY OF INVENTION

In various exemplary embodiments, the present invention comprises a dispensing tip or tool for use in dispensing a caulking or liquid sealant, typically in conjunction with tools commonly referred to as a "gun" or "caulking gun," which hold single cartridges, "sausage packs," or bulk forms of liquid sealant or caulk. The attachment end of the dispensing tip is round, circular, or polygonal in cross-section or shape, with threads or other attachment means designed to removably attach the dispensing tip to the gun and/or sealant cartridge, pack or bulk container, such as by a twist-and-lock base or collar and/or gun twist cap attached to or associated with the gun and/or sealant cartridge.

The dispensing tip flattens in cross-section towards the dispensing end, smoothly elongating in length and shortening in width. This configuration allows for smooth flow of the liquid sealant in the hollow interior (or channel) from the attachment end to the dispensing end. At or near the dispensing end, the interior flattens into a rectilinear, or to a near-rectilinear, shape in cross-section, with a similarly shaped generally rectilinear opening providing for the liquid sealant to emerge at a specific thickness (millage) and width.

The top side of the dispensing end extends further away from the attachment end than the bottom side of the dispensing end. This configuration allows the user to press down (i.e., towards the bottom side) during application to cause sufficient pressure is applied to ensure attachment of the sealant to the underlying panels. A pair of guide tabs are located at the edge of the top side, at opposite ends, to help guide and control the flow of the liquid sealant. The guide tabs cause the sealant to emerge and be placed over the gap, seam or joint to be sealed at a specific thickness and width. The height of the tabs helps guide and control the thickness of the sealant being applied, and the distance between the inner sides of the tabs help guide and control the width, in conjunction with the side walls extending from the end of the bottom side to the end of the top side. The tabs also may extend forward beyond the front edge of the top, thereby maintaining the correct thickness of the sealant even as the user rolls the tip upward to terminate a sealant application run.

A fin may be centrally located on the exterior of the bottom side, and is configured fit within the seam, gap or joint (i.e., between adjacent panels) so the user can ensure that the extruded sealant is properly centered on the seam, gap or joint during application. In some embodiments, the fin extends upward at an angle from a point on the bottom side, typically close to the attachment end, and increasing in height therefrom A notch in the bottom side proximate the fin allows for more sealant flow into the seam, gap or joint itself. In alternative embodiments, the fin and/or notch may be absent, or have a different shape or configuration (e.g., the notch may be rectilinear, curved or semi-circular, or some other shape)

The present invention thus allows a user to apply caulk single-handedly (although two hands may be used, if desired) at the correct thickness (millage) and width in a single trip or pass when applying a liquid sealant or caulk.

DETAILED DESCRIPTION OF EXEMPLARY EMBODIMENTS

Figure 1:
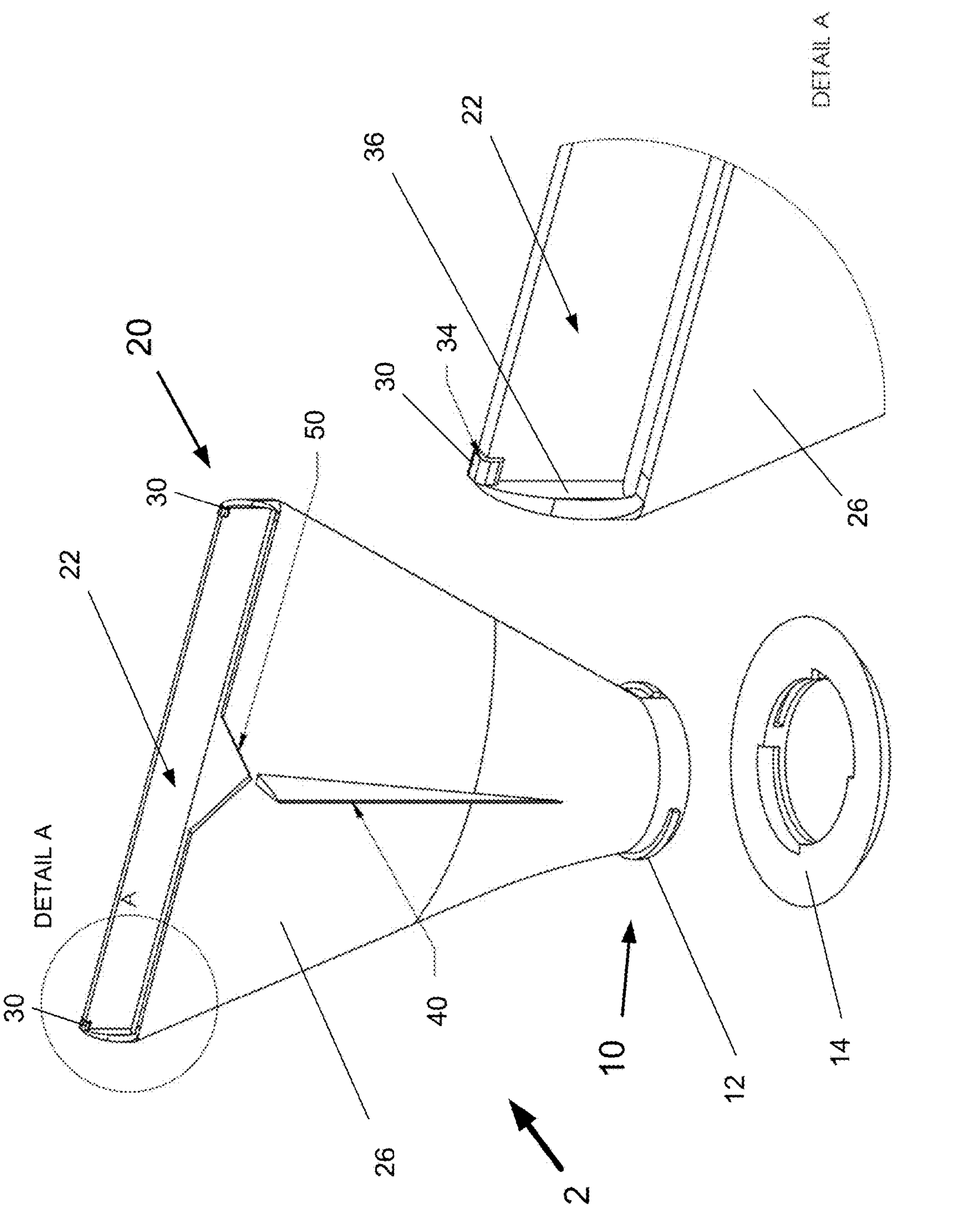
FIG. 1 shows a perspective view of a dispenser tip in accordance with an exemplary embodiment of the present invention.

In various exemplary embodiments, as seen in FIGS. 1-8, the present invention comprises a dispensing tip or tool 2 for use in dispensing a caulking or liquid sealant, typically in conjunction with tools commonly referred to as a "gun" or "caulking gun," which hold single cartridges, "sausage packs," or bulk forms of liquid sealant or caulk.

The attachment end 10 of the tip is round, circular, or polygonal in cross-section or shape, with threads or other attachment means 12 designed to attach the dispensing tip to the gun and/or sealant cartridge, pack or bulk container, such as by a twist-and-lock base or collar 14 and/or gun twist cap 16 attached to or associated with the gun and/or sealant cartridge. The tip 2 flattens in cross-section towards the dispensing end 20, smoothly elongating in length and shortening in width. This configuration allows for smooth flow of the liquid sealant in the hollow interior (or channel) as the liquid sealant is driven by the gun through an opening in the attachment end 10, through the hollow interior of the tip to the dispensing end 20.

At or near the dispensing end 20, the interior flattens into a rectilinear, or to a near-rectilinear, shape in cross-section, with a similarly shaped generally rectilinear opening 22 providing for the liquid sealant to emerge at a specific thickness (millage) and width. In the embodiment shown, the length of the dispensing end 20 and opening 22 is greater than the diameter of the attachment end 10, and the width of the dispensing end and opening is less than the diameter of the attachment end.

Figure 4:
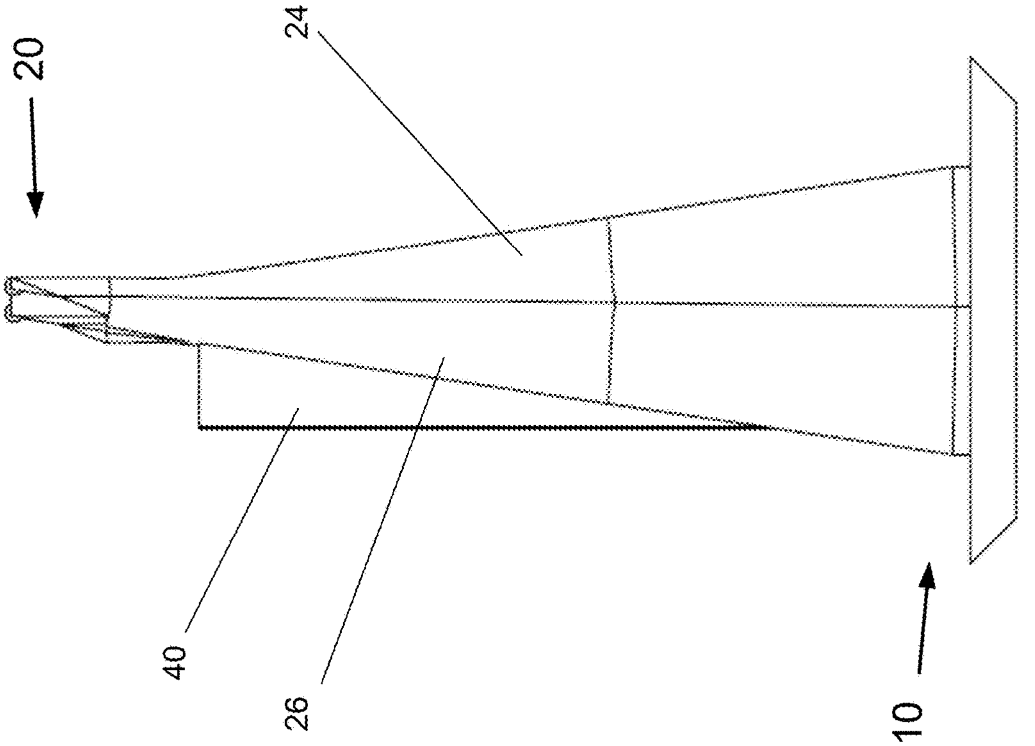
FIG. 4 shows a side view of the dispenser tip of FIG. 1.
Figure 5:
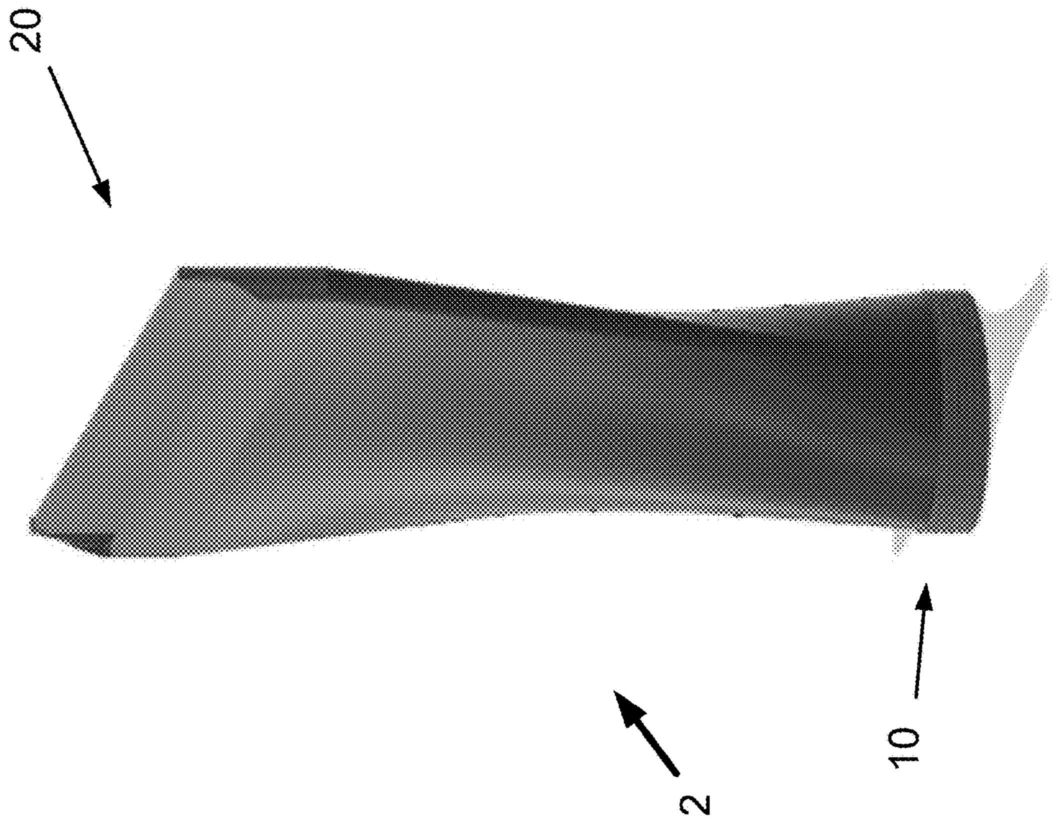
FIG. 5 shows a perspective view of a dispenser tip in accordance with another exemplary embodiment of the present invention.
Figure 6:
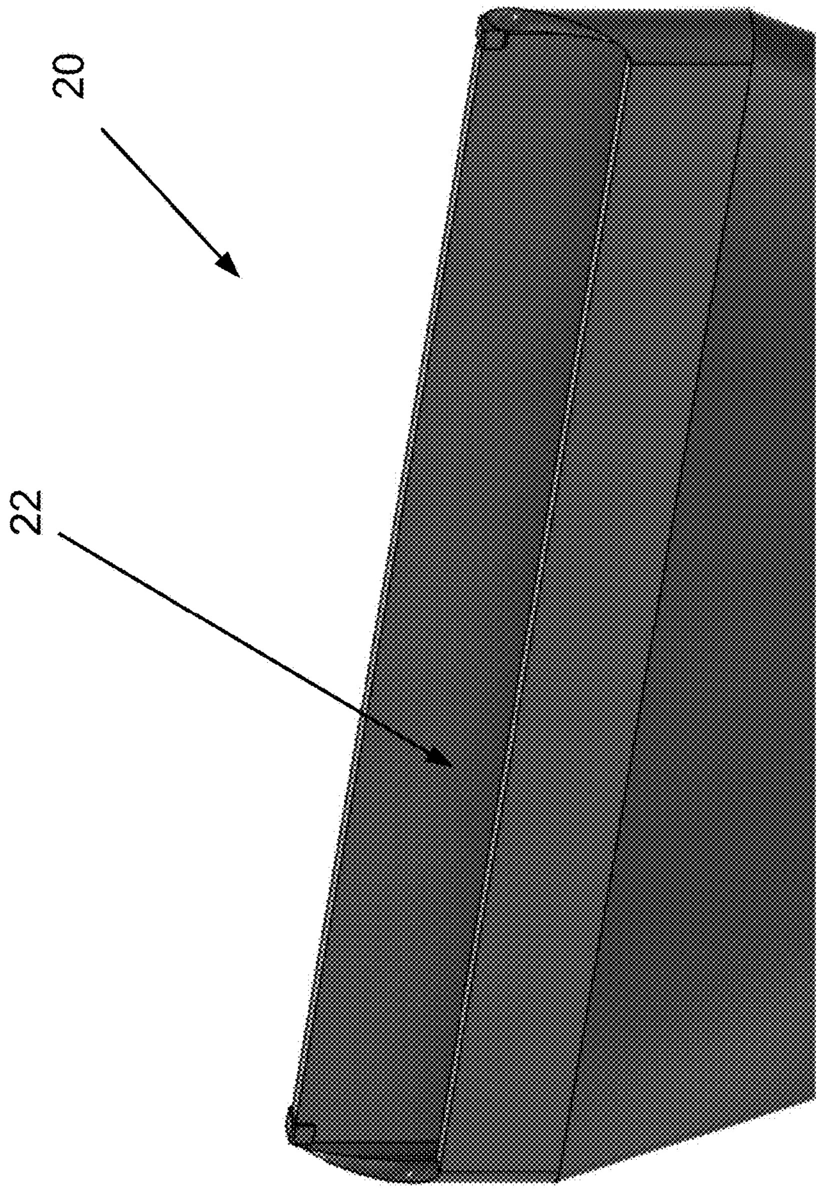
FIG. 6 shows a close-up view of the dispensing end of the tool of FIG. 5.
Figure 7:
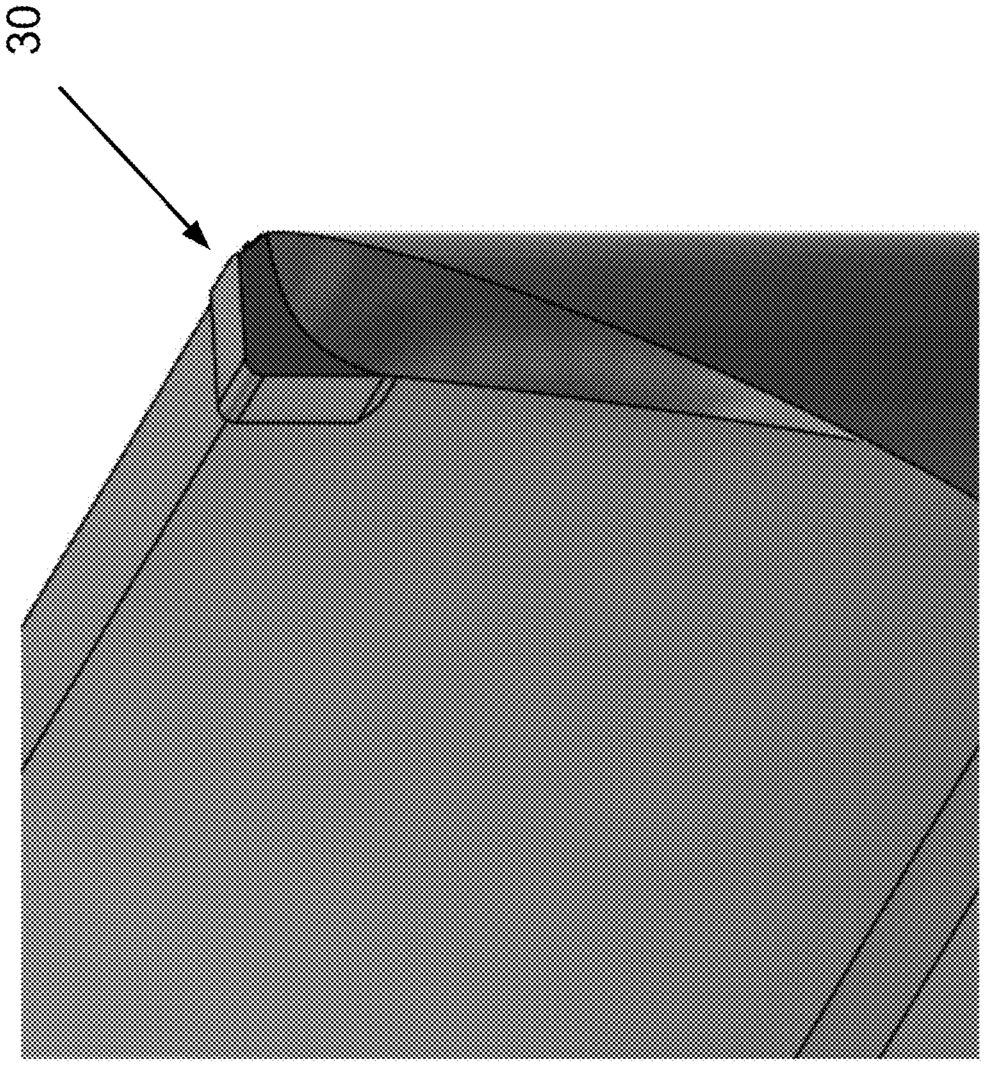
FIG. 7 shows a close-up view of a corner of the dispensing end of FIG. 6.
Figure 8:
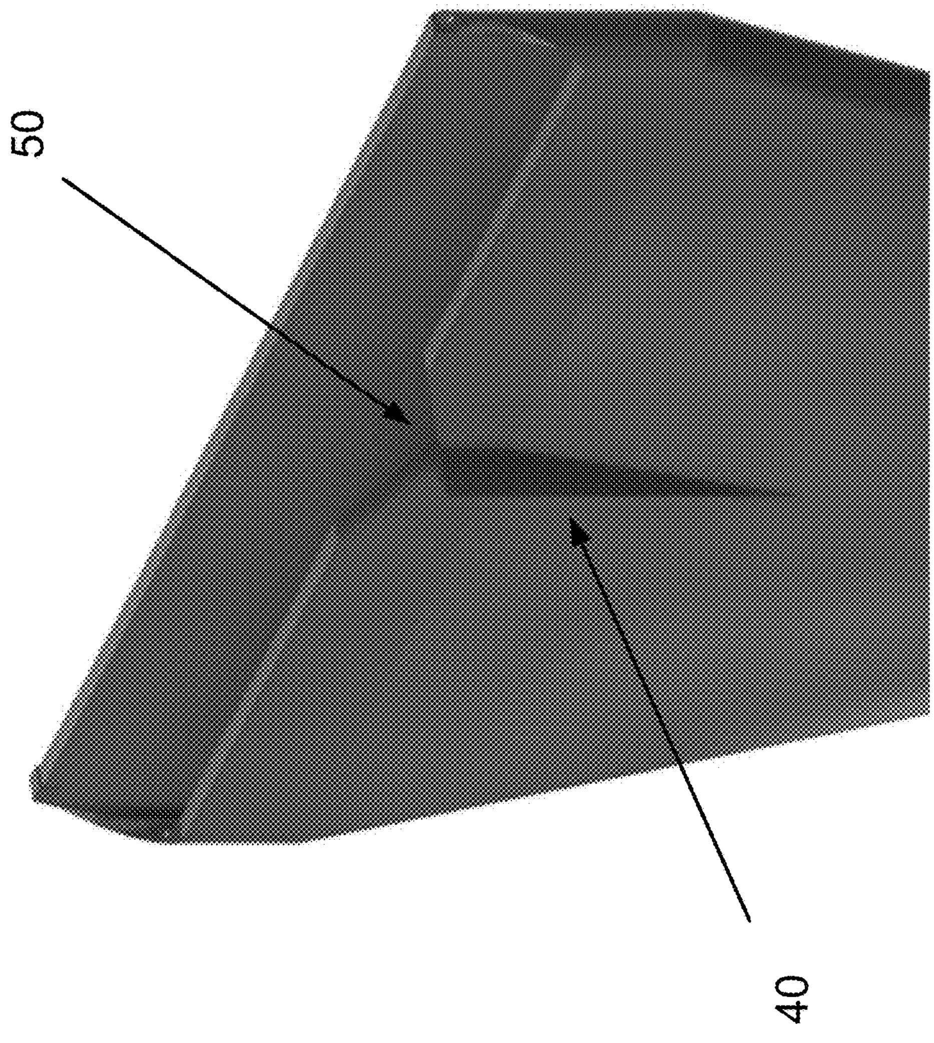
FIG. 8 shows a close-up view of the dispensing end with a notch and fin.

The top side 24 of the dispensing end 20 extends further away from the attachment end than the bottom side 26 of the dispensing end. This configuration allows the user to press down (i.e., towards the bottom side) during application to cause sufficient pressure is applied to ensure attachment of the sealant to the underlying panels. A pair of guide tabs 30 are located at the edge of the top side 24, at opposite ends, to help guide and control the flow of the liquid sealant. The guide tabs 30 cause the sealant to emerge and be placed over the gap, seam or joint to be sealed at a specific thickness and width. The height 32 of the tabs 30 helps guide and control the thickness of the sealant being applied, and the distance between the inner sides 34 of the tabs help guide and control the width, in conjunction with the side walls 36 extending from the end of the bottom side to the end of the top side. As seen in FIGS. 1 and 4, the tabs 30 also extend forward beyond the front edge 28 of the top, thereby maintaining the correct thickness of the sealant even as the user rolls the tip upward to terminate a sealant application run. The curved or curvilinear edge of the side walls 36 helps facilitates rolling the tip in this manner.

Figure 2:
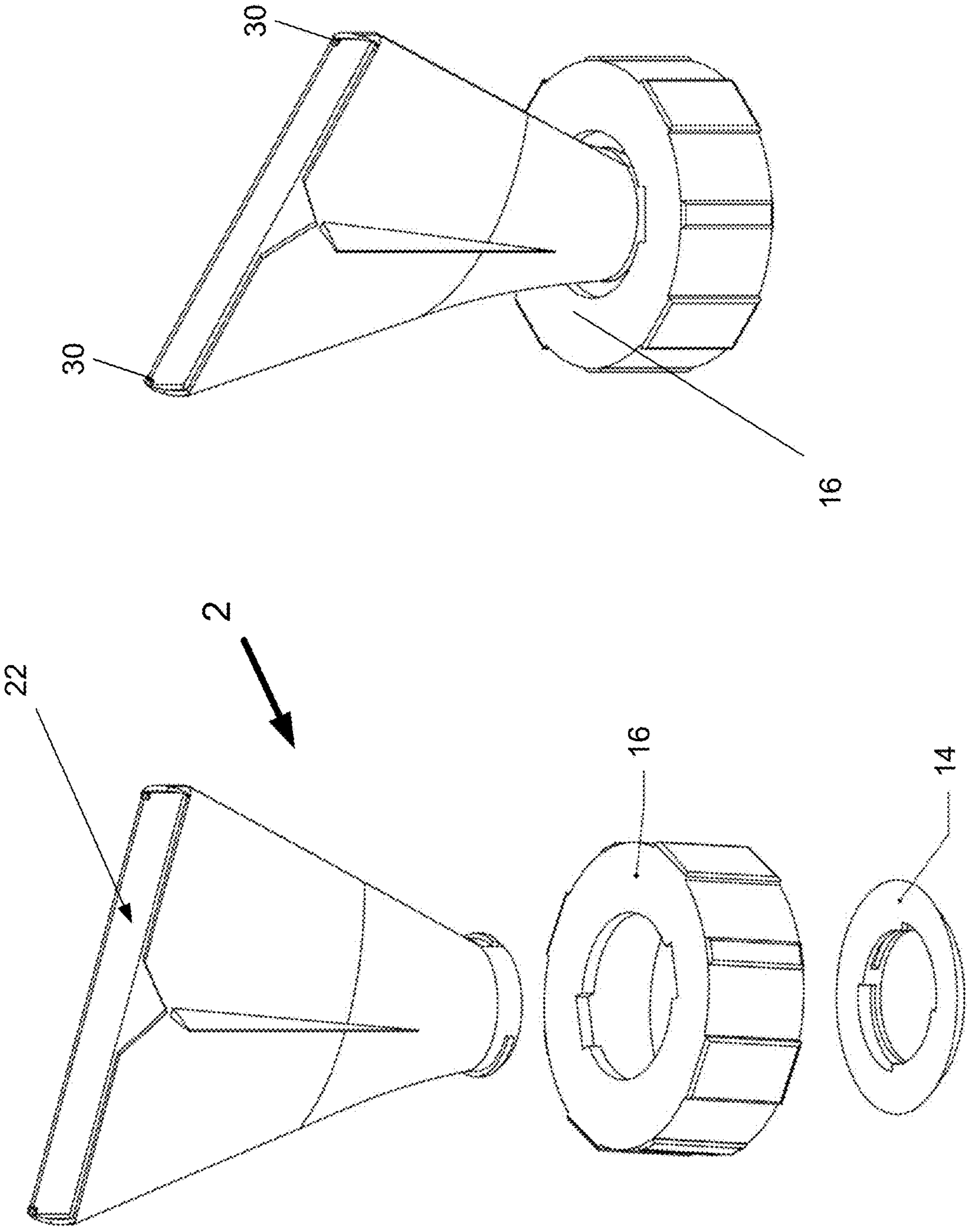
FIG. 2 shows a detail of a twist cap and locking base being attached to the back end of the dispenser tip.
Figure 3:
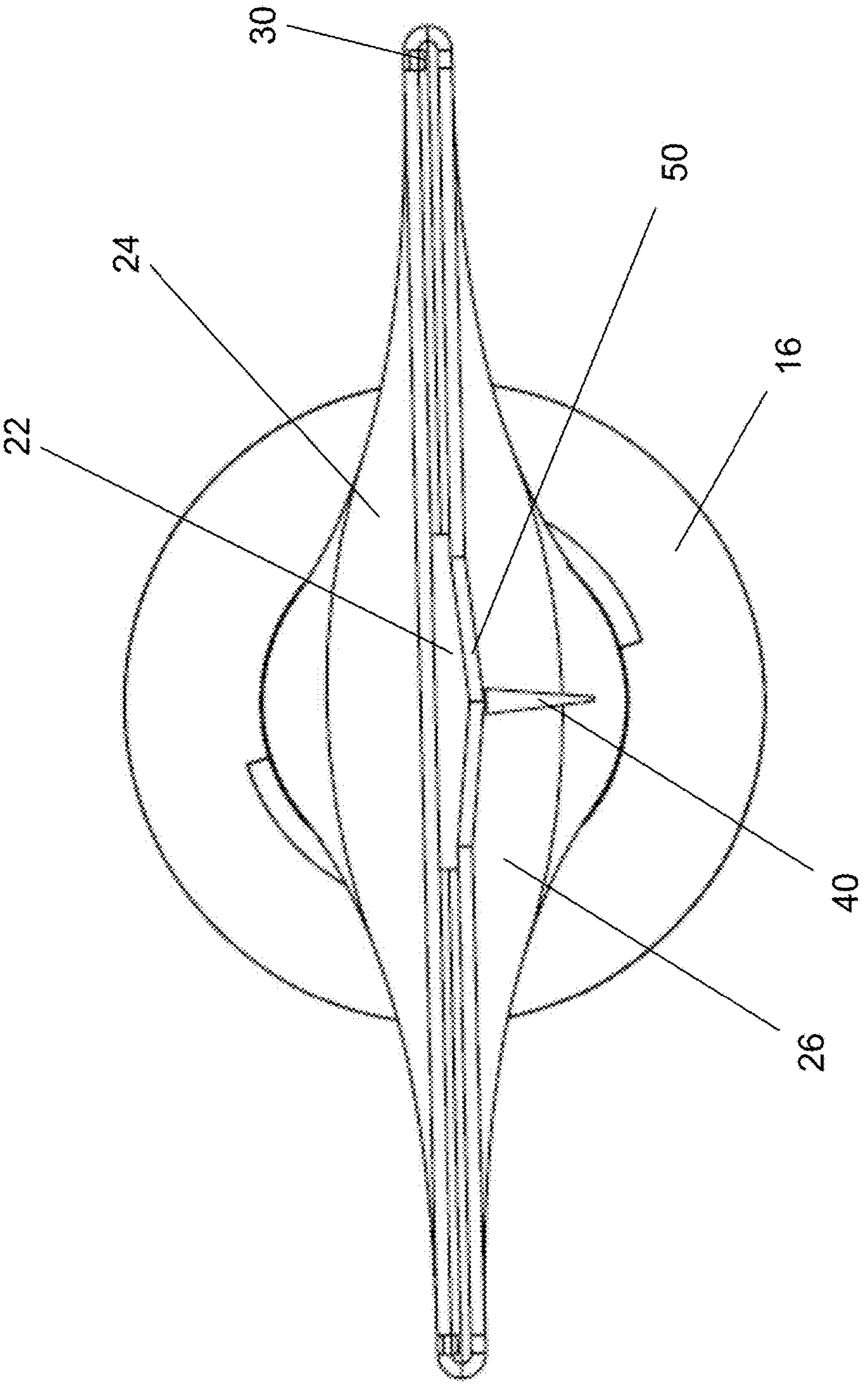
FIG. 3 shows a front-end view of the dispenser tip of FIG. 1.

FIGS. 1 and 2 shows a preferred embodiment of the bottom side 26. A fin 40 is centrally located on the exterior of the bottom side, and is configured fit within the seam, gap or joint (i.e., between adjacent panels) so the user can ensure that the extruded sealant is properly centered on the seam, gap or joint during application. In some embodiments, the fin extends upward at an angle from a point on the bottom side, typically close to the attachment end, and increasing in height therefrom A notch 50 in the bottom side proximate the fin allows for more sealant flow into the seam, gap or joint itself. In alternative embodiments, the fin and/or notch may be absent, or have a different shape or configuration than that shown (e.g., the notch 50 may be rectilinear, curved or semi-circular, or some other shape)

The present invention thus allows a user to apply caulk single-handedly (although two hands may be used, if desired) at the correct thickness (millage) and width in a single trip or pass when applying a liquid sealant or caulk. Prior art systems typically require multiple trips with substitution of different tips.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A dispensing tool for use with a caulking or liquid sealant gun or tool, comprising:

a dispensing tip with a hollow housing with a top side, a bottom side, an attachment end, and a dispensing end, wherein the attachment end is configured to be removably attached to a source of a liquid sealant;

a rectilinear opening in the dispensing end, the opening with a top side, a bottom side, a right side, and a left side, wherein the top side of the opening extends further away from the attachment end than the bottom side of the opening, wherein the right side and left side each comprise a sidewall edge extending from the bottom side of the opening to the top side of the opening, further wherein the sidewall edge is curved; and a pair of guide tabs positioned inside the opening at opposing ends of the top side of the opening, inside of the respective sidewalls, each of said guide tabs having a bottom not extending to the bottom side of the opening, and configured to guide liquid sealant as it flows through the opening.

2. The tool of claim 1, wherein the guide tabs are adjacent to the respective sidewalls.

3. The tool of claim 1, wherein each guide tab has a height, and an inner edge facing the other guide tab.

4. The tool of claim 3, wherein the height of the guide tabs, and the distance between the respective inner edges, control the thickness and width of the liquid sealant being applied.

5. The tool of claim 1, further comprising a fin located on the bottom side of the housing.

6. The tool of claim 5, wherein the fin is centrally located and extends linearly along the bottom side of the housing from a first point to a second point.

7. The tool of claim 6, wherein the first point is closer to the attachment end, and the second point is closer to the dispensing end.

8. The tool of claim 7, wherein the fin has a height.

9. The tool of claim 8, wherein the height of the fin at the first point is less than the height of the fin at the second point.

10. The tool of claim 9, wherein the fin extends upward from the first point rising in height to the second point.

11. The tool of claim 1, further comprising a notch in the bottom side of the opening.

12. The tool of claim 11, wherein the notch is triangular or angled.

13. The tool of claim 11, wherein the notch is centrally located along the bottom side of the opening.

14. The tool of claim 11, wherein the notch is configured to allow liquid sealant to flow therethrough.

15. The tool of claim 1, wherein the source of a liquid sealant is one or more of a caulking gun, a liquid sealant gun, a liquid sealant cartridge, and/or a liquid sealant sausage pack.

16. The tool of claim 1, wherein the attachment end is circular in cross section.

17. The tool of claim 1, further comprising threads disposed on the attachment end.

18. The tool of claim 17, wherein the threads are configured to engage matching threads on a corresponding locking base or collar.

* * * * *